US008867025B1

(12) United States Patent
Smalls

(10) Patent No.: US 8,867,025 B1
(45) Date of Patent: Oct. 21, 2014

(54) AERIAL, LANDING, AND TAKEOFF AIRCRAFTS CRASH AVOIDANCE SYSTEM

(75) Inventor: Bryan H. Smalls, Columbia, SC (US)

(73) Assignee: Bryan H. Smalls, Columbia, SC (US)

( * ) Notice: Subject to any disclaimer, the term of this patent is extended or adjusted under 35 U.S.C. 154(b) by 0 days.

(21) Appl. No.: 12/215,211

(22) Filed: Jun. 25, 2008

(51) Int. Cl.
*G01C 3/08* (2006.01)

(52) U.S. Cl.
USPC .......................................... 356/28; 356/28.5

(58) Field of Classification Search
USPC ............ 356/3.01–3.15, 4.01–4.1, 5.01–5.15, 356/6–22, 28, 28.5; 701/3–18
See application file for complete search history.

(56) References Cited

U.S. PATENT DOCUMENTS

| | | | | |
|---|---|---|---|---|
| 6,456,910 B1 * | 9/2002 | Roe | ................................ | 701/23 |
| 2007/0135989 A1 * | 6/2007 | Hengst | .......................... | 701/117 |
| 2009/0284258 A1 * | 11/2009 | Morrison et al. | ............. | 324/330 |

* cited by examiner

*Primary Examiner* — Luke Ratcliffe

(57) ABSTRACT

An aerial, landing, takeoff, aircraft collision avoidance system (10) that automatically operates an audible and visual display warning system within an aircraft by sensing when there is an intruder aircraft approaching on the same runway, intersecting runway, or same airway during climb, descent, and midair flight by employing a five-way interactive communication system using laser and radio wave technology and, thereby, providing added safety and protection for users of the system and oncoming aircrafts while being designed to automatically open a simultaneous three-way line of communication between pilots and air traffic controllers during crisis; identify and alert aircrafts what runways are presently in use during landings, taxiing, and takeoffs; and identify what runways are in use to taxiing aircrafts that may inadvertently cross a runway without clearance from air traffic control.

33 Claims, 7 Drawing Sheets

AERIAL, LANDING, AND TAKEOFF AIRCRAFTS CRASH AVOIDANCE SYSTEM

CROSS REFERENCE TO RELATED APPLICATIONS

The benefit of the filing of U.S. provisional patent application Ser. No. 60/936,790 filed Jun. 25, 2007 is claimed.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not applicable.

BACKGROUND OF THE INVENTION

This present invention relates generally to aviation collision avoidance system, and more particularly pertain to a new aerial, landing, and takeoff aircrafts collision avoidance system (ALTACAS) that automatically operates an audible and visual display warning system within an aircraft by sensing when there is an intruder aircraft approaching on the same runway, intersecting runway, or same airway during climb, descent, and midair flight by employing a five-way interactive communication system using laser and radio wave technology and, thereby, providing added safety and protection for users of the system and oncoming aircrafts while being designed to automatically open a simultaneous three-way line of communication between pilots and air traffic controllers during crisis; identify and alert aircrafts what runways are presently in use during landings, taxiing, and takeoffs; and identify what runways are in use to taxiing aircrafts that may inadvertently cross a runway without clearance from air traffic control.

The use of aircraft collision avoidance systems is known in prior art. More specifically, and notwithstanding the numerous designs encompassed by the crowed prior art, which systems have been developed for the countless objectives and requirements, aircraft collision avoidance systems heretofore devised and utilized are known to consist of familiar, expected and obvious concepts and structural configurations. Known prior art aircraft collision avoidance systems include U.S. Pat. Nos. 6,985,103; 6,789,016; 6,314,366; 6,252,525; 6,222,480; 6,118,401; 5,933,099; 5,636,123; 5,608,392; 5,493,309; 4,835,537; 4,298,875; 4,293,857; 4,139,848; 4,107,674 and U.S Pat. App. Nos. 20030043058 and 20020011950.

While these devices fulfill their respective, particular objectives and requirements, the aforementioned patents do not disclose the new aerial, landing, and takeoff aircrafts collision avoidance system. The inventive system is comprised of a plurality of LIDAR laser receivers (actually laser detecting sensors) and a plurality of LIDAR laser transmitters (actually solid-state lasers) and a RF or/and digital transmitter, a three-way wireless satellite communication device electrically coupled to a control panel having a central processing unit with a liquid crystal display (LCD) and a LIDAR radar screen for visible display, an audible warning device comprising of a playback module, and a navigational Global Positioning System (GPS) having a trajectory apparatus and software with a data entry system electrically coupled to a speed monitoring and processing device that is electrically, mechanically, and pneumatically connected to said multi-position optical laser lens; which are housed in a plurality of globular rotating devices; a remote control panel comprising of a central processing unit having a LCD, a RF or/and digital receiver, a warning device, and a three-way wireless satellite telecommunication device; a plurality of remote flashing light apparatuses having a receiver and transmitter.

In these respects, the new aerial, landing, and takeoff aircrafts collision avoidance system, according to the present invention, substantially departs from the conventional concepts and designs of the prior art, and in doing so provides an apparatus primarily developed for the purpose of automatically operating a audible and visual warning system within an aircraft by sensing when there is an intruder aircraft approaching on the same runway, intersecting runway, or same airway during climb, descent, and midair flight by employing a five-way interactive communication system using laser and radio wave technology and, thereby, providing added safety and protection for users of the system and oncoming aircrafts while being designed to automatically open a simultaneous three-way line of communication between pilots and air traffic controllers during crisis; identify and alert aircrafts what runways are presently in use during landings, taxiing, and takeoffs; and identify what runways are in use to taxiing aircrafts that may inadvertently cross a runway without clearance from air traffic control.

BRIEF SUMMARY OF THE INVENTION

In view of the forgoing disadvantages inherent in the known types of aircraft collision avoidance systems now present in the prior art, the present invention provides a new aerial, landing, and takeoff aircrafts collision avoidance system wherein the same can be utilized for automatically operating a audible and visual warning system within an aircraft by sensing when there is an intruder aircraft approaching on the same runway, intersecting runway, or same airway during climb, descent, and midair flight by employing a five-way interactive communication system using laser and radio wave technology and, thereby, providing added safety and protection for users of the system and oncoming aircrafts while being designed to automatically open a simultaneous three-way line of communication between pilots and air traffic controllers during crisis; identify and alert aircrafts what runways are presently in use during landings, taxiing, and takeoffs; and identify what runways are in use to taxiing aircrafts that may inadvertently cross a runway without clearance from air traffic control.

The general purpose of the present invention, which shall be described subsequently in greater detail, is to provide a new aerial, landing, and takeoff aircrafts collision avoidance system and method which has some of the advantages of the aircraft collision avoidance system mentioned heretofore and many novel features that result in an aircraft collision avoidance system which is not anticipated, rendered obvious, suggested, or even implied by any of the prior art aircraft collision avoidance systems, either alone or in any combination thereof.

To attain this, the present invention generally comprises a plurality of LIDAR laser receivers (laser detecting sensors) and a plurality of LIDAR laser transmitters (solid-state lasers) and a RF or/and digital transmitter, a three-way wireless satellite communication device electrically coupled to a control panel having a central processing unit with a liquid crystal display (LCD) and a LIDAR radar screen for visible display, an audible warning device comprising of a playback module, and a navigational Global Positioning System (GPS) and a navigational Global Positioning System (GPS) having a trajectory apparatus and software with a data entry system electrically coupled to a speed monitoring and processing device that is electrically, mechanically, and pneumatically connected to multi-position optical laser lens; which are housed in a plurality of globular rotating devices; a remote control panel comprising of a central processing unit having a LCD, a RF or/and digital receiver, a warning device, and a three-way wireless satellite telecommunication device; a plurality of remote flashing light apparatuses having a receiver and transmitter.

The present invention has several advantages over prior art conventional aircraft collision avoidance systems including, but not being limited to, a novel aviation crash avoidance system. Generally, aircrafts departing and arriving at airports do so under the directions of Terminal Radar Control (TRACON) and the Air Route Traffic Control Center (ARTCC). Some airports do not have TRACON service available on their premises and must therefore rely on services located elsewhere—that is, where radar coverage permits. In some countries without these services, mid-sized airports have a dedicated approach radar controller based upon the airport itself to monitor inbound aircrafts and to provide radar services in the vicinity of the airport. During times of heavy traffic, when additional help is needed to monitor the radar screen and help maintain smooth air traffic flow, another controller called the radar hand-off controller, assists the radar and associate radar controllers. During aircraft scheduling and descents to airports, center controllers are assisted by software called Traffic Management Advisor (TMA) that help in scheduling when each plane should arrive and in what order it should be placed for descent. This system also takes into consideration the airport's traffic capacity by looking at the number of planes allowed to land within a given period of time at an airport and compares it to the number of planes scheduled. If the scheduled amount of landing aircrafts exceeds the airport's traffic capacity, this condition is called rush alert. During this alert, TMA calculates the number that can be landed safely and makes recommendations to the coordinator for adjustments in the air-traffic pattern. This information is passed on to the controllers, who then give appropriate directions to the pilots. However, Past and recent events have brought to the public awareness the apparent limitations of existing air traffic control (ATC) and crash avoidance systems. There have been ongoing incidents where in-bound airplanes that were landing or taxiing had collisions or near collisions with takeoff aircraft on the same runway or airways during initial climb. There have also been incidents involving aircrafts at intersecting runways—that is, one plane proceeding down the runway must cross the path of another runway to depart from the airport. Moreover, there are other areas of the runway that are more prone to accidents, which are called hotspots. Hotspots are areas where taxiways paralleling runways can be mistaken for runways, where a main taxiway crosses a runway, and where complex runway and taxiway layouts may cause pilots to become confused, misdirected, and placed in harms way of other aircrafts. Statistics suggest that nearly eighty percent of all aviation accidents occur shortly before, after, or during takeoff or landing. Pilots, air traffic controllers, and other human errors are mostly responsible for these accidents. The current aviation safety systems provide limited protection for departing and arriving aircraft, which is dependant on the competence and alertness of air traffic control.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways/ Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the scope of the present invention including, but not limited to, that which is encompassed by the claims be regarded as including such equivalent constructions insofar as such construction do not depart from the spirit and scope of the present invention.

It is therefore a feature of the present invention in that it provides a new aerial, landing, and takeoff aircrafts collision avoidance system and method which has some of the advantages of the aircraft collision avoidance systems mentioned heretofore and many novel features that result in a new aerial, landing, and takeoff aircrafts collision avoidance system of the present application, which is not anticipated, rendered obvious, suggested, or even implied by any of the prior art aircraft collision avoidance systems, either alone or in any combination thereof.

It is a another feature of the present invention in that it provides a new aerial, landing, and takeoff aircrafts collision avoidance system which gives additional available reaction time for pilots trying to prevent a collision during takeoffs, climb and descent, and midair flights. Every second is indispensible when aircrafts are on collision course with each other. Any safety system that can provide additional reaction time to pilots may help avert a catastrophe. Runway incursions are subdivided into categories from A to D, depending on the level of severity. In these categories, having available reaction time is important. For example, in Category D, reaction time is not crucial because there is sufficient time to consider multiple alternatives in order to avoid a collision; and in Category C there is sufficient time to smoothly execute an unplanned evasive action. However, in Category B there is barely enough time to take an emergency evasive action; and in Category A, instantaneous reaction and radical evasive action are required. This present invention mostly provides pilots with additional available reaction time on runways during takeoffs and landings by alerting them from a predetermined distance of possible impending danger.

It is a further feature of the present invention in that it provides a new aerial, landing, and takeoff aircrafts collision avoidance system that operates independent of pilots and air traffic control thereby minimizing any disaster caused by human error. It automatic assists controllers and pilots during takeoffs, landings, climbs and descents, and midair flights by monitoring and alerting them of potential dangers that may have been overlooked. The present invention gives air traffic controllers and pilots another edge in aviation safety, especially during landings and takeoffs.

An even further feature of the present invention is that it provides a new aerial, landing, and takeoff aircrafts collision avoidance system wherein pilots are immediately made aware of impending danger without having to wait to be informed by air traffic controllers.

Still yet another feature of the present invention is that it provides a new aviation crash avoidance system that can easily be integrated into existing aviation safety systems.

Still another feature of the present invention is that it provides a new aerial, landing, and takeoff aircrafts collision avoidance system, that provides in the apparatuses, systems, and methods of the prior art some of the advantages thereof, while simultaneously overcoming some of the disadvantages normally associated therewith.

Yet another feature of the present invention in that it provides a new aerial, landing, and takeoff aircrafts collision avoidance system that automatically operate an audible and visual display warning system within an aircraft by sensing when there is an intruder aircraft approaching on the same runway, or same airway during climb, descent, and midair flight by employing a five-way interactive communication system using laser, radio wave or/and digital, or satellite communication technology and, thereby, providing added safety and protection for users of the system and oncoming aircrafts.

Still yet another feature of the present invention in that it provides a new aerial, landing, and takeoff aircrafts collision avoidance system that automatically forewarns intruder aircrafts by an audible and visual warning system that it is approaching an aircraft on the same runway, intersecting runway, or same airway during climb, descent, and midair flight.

Still yet another feature of the present invention in that it provides a new aerial, landing, and takeoff aircrafts collision avoidance system that automatically opens a simultaneous three-way line of communication between air traffic controllers and all involved pilots during a crisis.

Yet another feature of the present invention in that it provides a new aerial, landing, and takeoff aircrafts collision avoidance system that automatically identifies and alert aircrafts what runways are presently in use during landings, taxiing, and takeoffs by sensing a takeoff aircraft and automatically operating an array of flashing lights for a predetermined time, which are located on each side of a runway, while simultaneously issuing an audible or visual (display on LCD) warning to other aircrafts in the vicinity concerning what runways are currently in use. Flashing lights deactivates as plane passes, thereby showing the approximate location of a plane as it travels down the runway.

Yet another feature of the present invention in that it provides a new aerial, landing, and takeoff aircrafts collision avoidance system that automatically identifies and alert aircrafts on intersecting runways of possible danger by allowing an aircraft before takeoff to automatically activate an array of flashing lights for a predetermined time, which are located on each side of a runway, which in return sends a signal that activates a second array of flashing lights on intersecting runway, momentarily warning other aircrafts not to proceed. Flashing red lights will cease once takeoff plane pass the intersection Even still another feature of the present invention in that it provides a new aerial, landing, and takeoff aircrafts collision avoidance system that automatically identifies to taxiing aircrafts that may inadvertently cross a runway without clearance from air traffic control what runways are in use through array of flashing lights activated by takeoff and landing aircrafts.

Together with the other advantages and benefits provided by the invention, along with the various features of novelty which characterize the invention, and which are pointed out with particularity as described herein, for a better understanding of the invention, its operating advantages and the specific objects attained by its uses, reference should be made to the accompanying drawings and descriptive matter in which there is illustrated preferred embodiments of the invention.

DESCRIPTION OF THE PREFERRED EMBODIMENT

Figure 1:
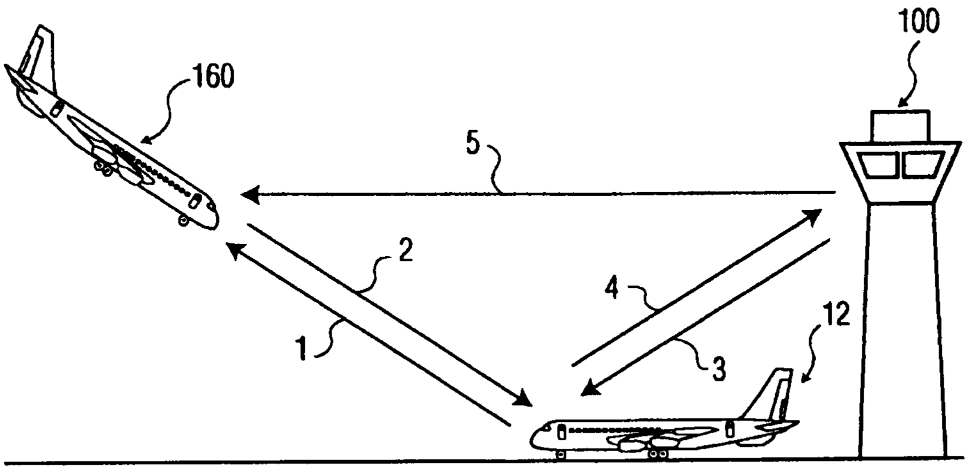
FIG. 1 is an illustration of the five-way interactive communication crash avoidance system when initiated by takeoff aircraft.

Aircrafts departing from and returning to airports have sometimes encountered others that threaten the safety of occupants. Even with the aviation safety systems of prior art, there have been ongoing incidents where in-bound airplanes that were landing or taxiing had collisions or near collisions with takeoff aircrafts on the same runways, intersecting runways, or airways during initial climb. The present invention is a new five-way interactive communication aerial, landing, and takeoff crash avoidance system for aircrafts that warns and minimizes these issues. The five-way interactive communication collision avoidance system employs LIDAR laser and radio wave and/or digital technology that assist in preventing collisions between in-bound landing aircrafts and takeoff aircrafts on the same runways and airways during climb and descent; assist in preventing collisions between mid-air aircrafts traveling directly toward each other in the same airspace; opening a simultaneous three-way line of communication between air traffic controllers and all involved pilots during a crisis; sensing and alerting inbound aircrafts of which runways are currently in use during landings, taxiing, and takeoffs by means of flashing lights; sensing and alerting landing, taxiing, and takeoff aircrafts when intersecting runways are in use; and identifying what runways are in use to taxiing aircrafts that may inadvertently cross a runway without clearance from air traffic control The five-way interactive communication collision avoidance system for aircrafts and advantages may prove to be useful for alerting aircrafts of possible dangers posed by other aircrafts, such as the following: (1) aircrafts that are taking off from runways, (2) aircrafts that are landing on runways, (3) aircrafts that are taxiing on runways, (4) aircrafts taking off or landing on crossing runways, and (5) aircrafts during mid-air flights. This present invention can also be used to improve highway safety, locomotive safety, and water transport safety.

With reference now to the drawings, wherein identical reference numerals denote the same elements throughout the various views, and in particular to FIGS. 1 through 12 thereof, a new aerial, landing, and takeoff aircrafts crash avoidance system (ALTACAS) embodying the principles and concepts of the present invention and generally designated by the reference numeral 10 will be described.

Figure 3A:
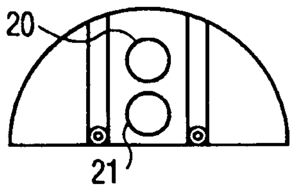
FIG. 3A-D are front and side views of globular rotating device that houses the LIDAR laser transmitter-receiver and showing multi-positioned lenses at varying degrees of angles (e.g. 0°, 45°, and 90°).
Figure 3B:
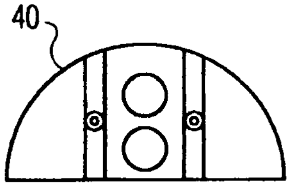
Figure 3C:
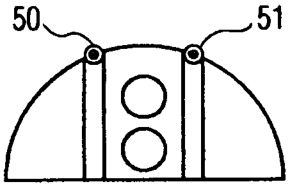
Figure 11:
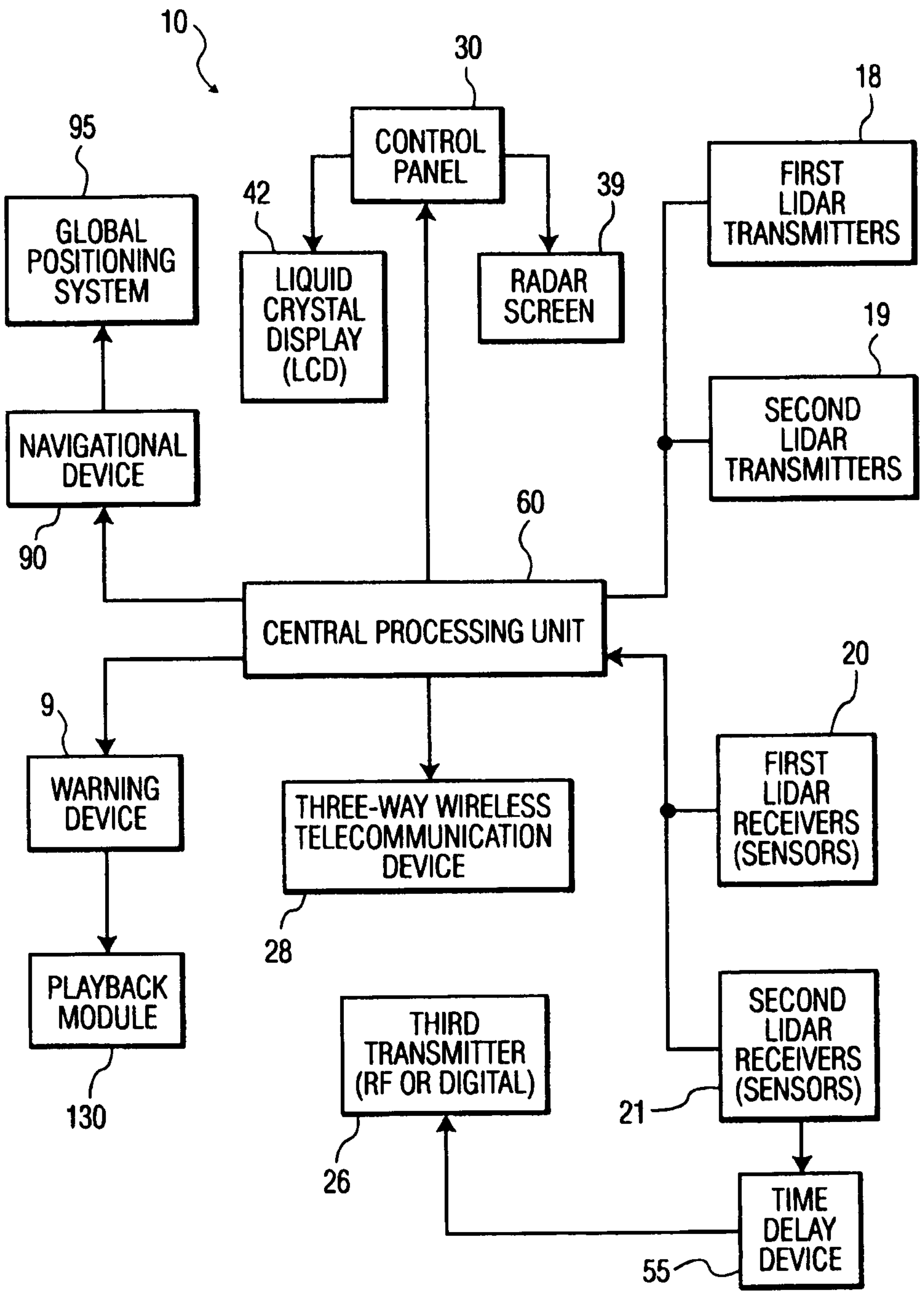
FIG. 11 is a block electrical diagram of new aviation crash avoidance, according to a preferred embodiment of the present invention.

More specifically, as shown in FIG. 1, aircraft 12 is equipped with ALTACAS 10. As shown in FIG. 11, it will be noted that ALTACAS 10 has a plurality of first LIDAR laser transmitters (emitters) 18 and first LIDAR laser receivers (sensors) 20, and has a plurality of second LIDAR laser transmitters (emitters) 19 and second laser receivers (sensors) 21 as a means of detecting and warning aircrafts. However, it is contemplated by the present invention that a wide variety of transmitters 18 and 19 and receivers 20 and 21 not limited to LIDAR lasers transmitters and receivers can be employed. As shown in FIG. 3A-D, LIDAR laser transmitters 18 and 19 and LIDAR laser receivers 20 and 21 are housed within globular rotating device 40. As shown in FIG. 4, aerodynamically designed pivotal devices 40 can be attached within an aircraft's wings 36, nose 38, and fuselage 48 for detecting oncoming aircrafts towards the front portion of aircraft 12 during landing, takeoffs, and taxiing; and detect omni-directional during midair flight of the aircraft 12.

As shown in FIG. 11, a control panel 30 has a central processing unit 60 and is electrically coupled to a navigational Global Positioning System (GPS) having a trajectory apparatus 82 (not shown) and software with a data entry system 86 (not shown) electrically coupled to a speed monitoring and processing device 99 (Not shown) that is electrically, mechanically, and pneumatically connected to multi-position optical laser lenses 50 and 51 (shown in FIG. 3C); navigational device 90 comprising of a Global Positioning System 95 that mechanically or/and pneumatically controls the vertical movement of multi-positioned laser lenses 50 and 51 (shown in FIG. 3) of LIDAR laser transmitter 18 and second LIDAR laser transmitter 19 as a means of sending pulsating laser beams from aircraft 12 and detecting aircraft 160 (shown in FIG. 1) from a suitable distance away, preferably at least 1.3 miles. Aircraft 160 is equipped with ALTACAS 10 and pulsating laser beam from aircraft 12 are received by LIDAR laser receivers (sensors) 20 and 21 of aircraft 160. As shown in FIG. 3A-C, the multi-positioned laser lenses 50 and 51 are capable of being angled at varying degrees to monitor the runway and airway of aircraft 12 at different stages of takeoff and climb until it reaches the correct flight level altitude.

A navigational device 90 comprising of a Global Positioning System 95 and a control device 135 (not shown) that is capable of monitoring the takeoff speed of an aircraft and automatically calculate, control, and mechanically adjust the up and down movement of the multi-position laser lenses 50 and 51 to different angles based upon initial specified data pilot enters into the control panel 30 before takeoff. As an alternative, the automatic adjusting laser lenses 50 and 51 can be replaced with laser lenses that are preset at varying angles of degrees to monitor the runway and airway of a takeoff aircraft.

The central processing unit 60 is electrically coupled to a warning device 9 comprising of playback module 130 within the aircraft 12 and oncoming aircrafts that are equipped with ALTACAS 10, more specifically aircraft 160. Thereafter the central processing unit 60 electrically activates warning device 9 comprising of playback module 130 within the aircraft 12 and oncoming aircrafts 160, thereby forewarning aircraft 12 and aircraft 160 of pending danger.

As shown in FIGS. 3 and 4 of the drawings, the detecting means comprises a plurality of first LIDAR laser transmitters 18 and first laser receivers (sensors) 20, and has a plurality of second LIDAR laser transmitters 19 and second LIDAR laser receivers (sensors) 21 for detecting aircrafts in the direct path of aircraft 12.

Only planes in a continuous direct line of path with aircraft 12 will trigger and keep playback module 130 activated because laser beams (signals) from LIDAR laser transmitters 18 and 19 are unidirectional and linear—that is, they travel in a straight line and do not expand as widely as microwaves signal. For example, at 1,000 feet the LIDAR laser beam is 3 feet square and at 1.3 miles a LIDAR laser beam is approximately 15 feet square. In comparison, microwaves are 250 feet square at 1,000 feet. The pinpoint accuracy of LIDAR laser beams is ideal for identifying objects in the direct line of path, such as aircrafts on the same runways and airway during takeoffs, landings, and taxiing.

As shown in FIG. 11 of the drawings, the control panel 30 comprises a liquid crystal display (LCD) 42 and radar screen 39 that automatically provides pilots with imagery, location, altitude, distance, speed, and direction of other aircrafts dangerously approaching aircraft 12.

As shown in FIGS. 6, 7, 8, and 12, pulsating laser beam from LIDAR transmitters 18 and 19 of aircraft 12 during takeoff are capable activating a first array of lights on plurality of remote apparatuses 110 comprising of laser sensors 99 (not shown) to show runway usage, wherein plurality of remote flashing lights apparatus 110 carries a transmitter 120 (not shown) that is capable of sending signals to LCD 42 of control panel 30 of aircraft 160 through receiver 250 (not shown) electrically coupled to central processing unit 60 to activate warning device 9 comprising of playback module 130. In response to being activated, remote flashing light apparatus 110 through transmitter 120 is also capable of sending a signal to activate a third array of lights on remote flashing lights apparatus 110 located on intersecting runway by means of receiver 150 (not shown) located within remote flashing light apparatus; momentarily warning other aircrafts not to proceed. Third array of lights on remote flashing lights apparatus 110 will cease once takeoff aircraft 12 passes the intersection. A second array of lights on rear face of remote flashing lights apparatus flashes when Aircraft 12 is landing. Alternatively, other sources such as light, motion, infrared, sonic, or microwave technology can be used to activate remote flashing lights apparatus 110 by aircraft 12.

Figure 2:
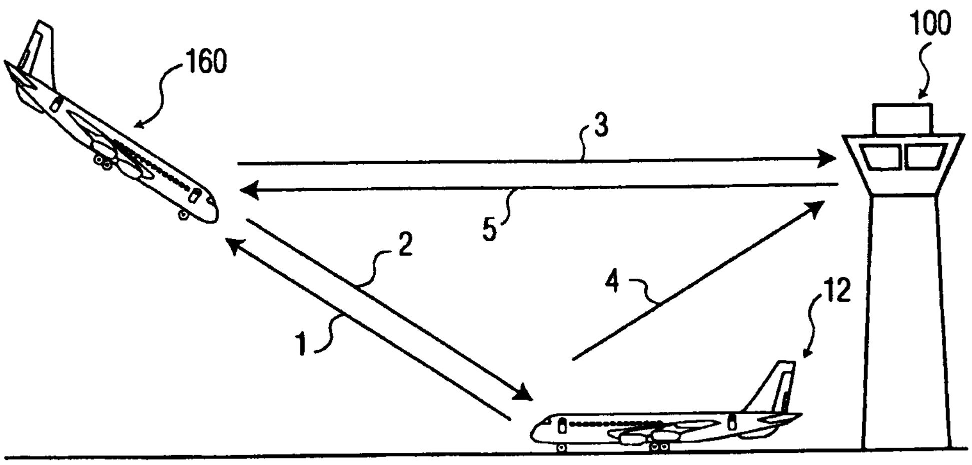
FIG. 2 is an illustration of the five-way interactive communication crash avoidance system when initiated by landing aircraft.

As shown in FIGS. 1, 2 and 11 of the drawings, the first LIDAR laser transmitter 18 of aircraft 12 is capable of transmitting signals, such as pulsating laser beams, that are detected by first LIDAR laser receiver (sensor) 20 that is housed by aerodynamically designed pivotal devices 40 located on the oncoming aircraft 160. The LIDAR laser receiver (sensor) 20 is electrically coupled to a warning device 9 comprising of a playback module 130 that audibly warns the pilots in oncoming aircraft 160 when they are on a collision course with aircraft 12. LIDAR Laser receiver (sensor) 20 is further electrically coupled to a second LIDAR laser transmitter 19 within oncoming aircraft 160 that is capable of retransmitting signals that are detected by a second LIDAR laser receiver (sensor) 21 housed within globular rotating device 40 of aircraft 12. Upon receiving such signals, second LIDAR laser receiver (sensor) 21 activates warning device 9 comprising of a playback module 130 that audibly warns the pilots in aircraft 12 when they are on a collision course with oncoming aircraft 160.

Figure 12:
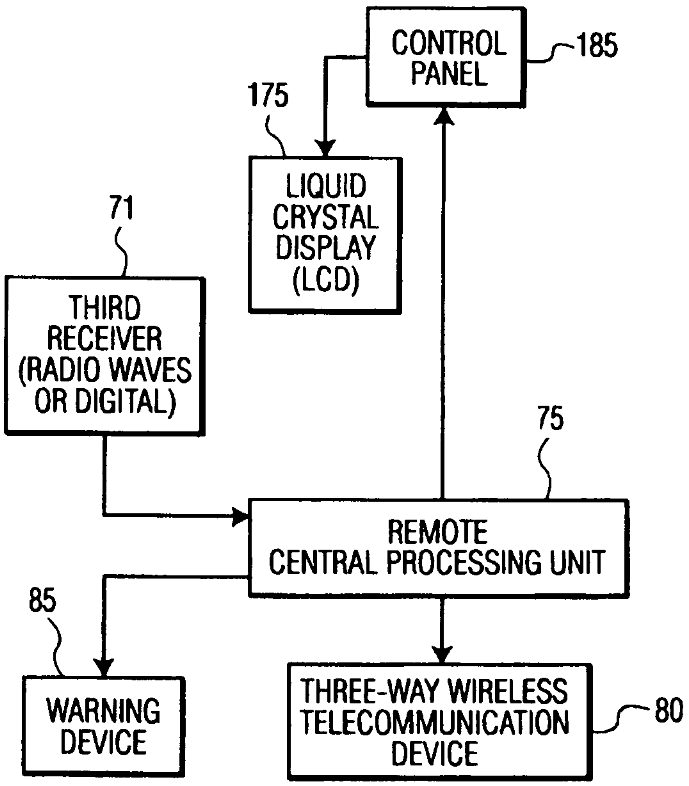
FIG. 12 is a block electrical diagram of remote central processing unit and accompanying devices according to a preferred embodiment of the present invention.

As shown in FIGS. 11 and 12, the second laser receiver (sensor) 21 is electrically coupled to a third transmitter 26. Third transmitter 26 is capable of sending RF or/and digital signals and data over a significant distance to a remote central processing unit 75 located on console of air traffic control 100 (as shown in FIGS. 1 and 2) by means of a third receiver 71 that alerts air traffic control 100 by means of a warning device 85. However, it is contemplated by the present invention that a wide variety of transmitters 26 and receivers 71 not limited to RF and digital transmitters and receivers can be employed. Third receiver 71 also activates a three-way satellite wireless telecommunication device 80 that allows air traffic control 100 to simultaneously have a three-way conversation with aircraft 12 and any aircrafts on a collision course with aircraft 12, such as oncoming aircraft 160 by means of a three-way wireless telecommunication device 28 that is located on aircraft 12 and aircraft 160 (as shown in FIG. 11). As shown in FIG. 11, the second LIDAR laser receiver (sensor) 21 is electrically coupled to the third transmitter 26 through a time delay device 55. The delay time's purpose is to prevent third transmitter 26 from immediately sending a warning signal to air traffic control 100 by means of third receiver 71 unless there is a sustained threat that aircraft 12 is on a collision course with other aircrafts, such as aircraft 160.

Preferably, the audible warnings that occurs in oncoming aircraft 160 is at least 1.3 miles from aircraft 12; however, other distances are contemplated depending on the distance required to safely and effectively warn oncoming aircrafts. In operation, first LIDAR transmitter 18 of aircraft 12 sends a signal to first LIDAR receiver 20 of aircraft 160, which activates an audible warning within the cockpit of an approaching aircraft, such as oncoming aircraft 160. Thereafter, second LIDAR transmitter 19 of aircraft 160 sends a signal to second LIDAR receiver 21 of aircraft 12 to activate an audible warning within the cockpit of aircraft 12. Therefore, aircraft 12 and the oncoming aircraft 160 are warned by a combination of audible warning and visible warning. While these embodiments can be added to an aircraft after purchase, they are better incorporated into the aircraft during manufacture. This new five-way transmitter/receiver system may also be employed at train crossings and at highway intersection having a stop sign(s) so that an oncoming vehicle can be warned both audibly and visibly by warning lights at a train crossing when a train is approaching.

As to a further discussion of the manner of usage and operation of aerial, landing, and takeoff aircrafts crash avoidance system (ALTACAS) 10, the same should be more apparent from the summary described below.

Figure 5:
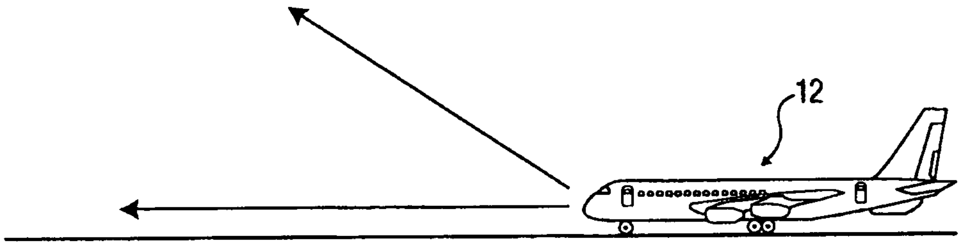
FIG. 5 is a side view of the aircraft monitoring runway and airway before takeoff.

As shown in FIGS. 3, 5, and 11, the aircraft 12 taxis onto the runway and its pilot enters specific data into the navigational device 90 through control panel 30 that automatically adjusts laser lenses 50 and 51 to monitor the runway and projected airway of aircraft 12 during initial lift-off. This estimated projection of the plane's lift-off point is calculated using such factors as the Maximum Take-Off Weight (MTOW) or Regulated Maximum Take-Off Weight (RTOW); the V speeds such as $V_{FTO}$ speed (final takeoff speed), the $V_{lof}$ speed (lift-off speed), and Takeoff Run Available (TORA—the length of runway declared available and suitable for taking off). These information are readily available to pilots before takeoff.

As shown in FIGS. 5 and 11, before takeoff, aircraft 12 automatically monitors and confirms that no other inbound airplanes are present in direct path by sending pulsating signals from the LIDAR laser transmitters 18 down the runway and into the projected airway.

As shown in FIGS. 6, 7, 8, 11, and 12. The pulsating laser beams from aircraft 12 LIDAR laser transmitters 18 automatically activates some of the first array of lights on remote flashing lights apparatus 110. Once remote flashing lights apparatus 110 are activated, signals from transmitter 120 (not shown) located within remote flashing lights apparatus 110 are sent to air traffic control 100 through fourth receiver 199 (not shown) which is electrically coupled to remote processing unit 75 to show runway usage on liquid Crystal display 175.

Figure 6:
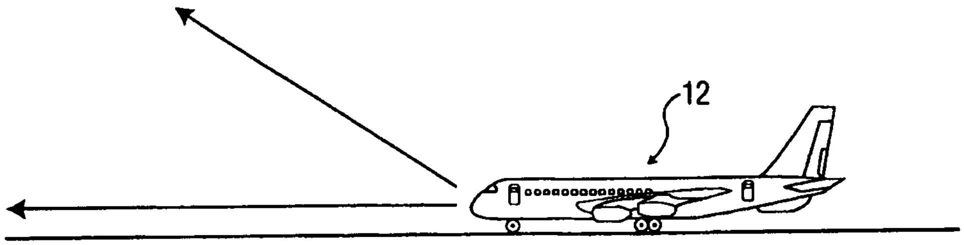
FIG. 6 is a side view of the aircraft monitoring runway and airway as it proceeds down runway.
Figure 7:
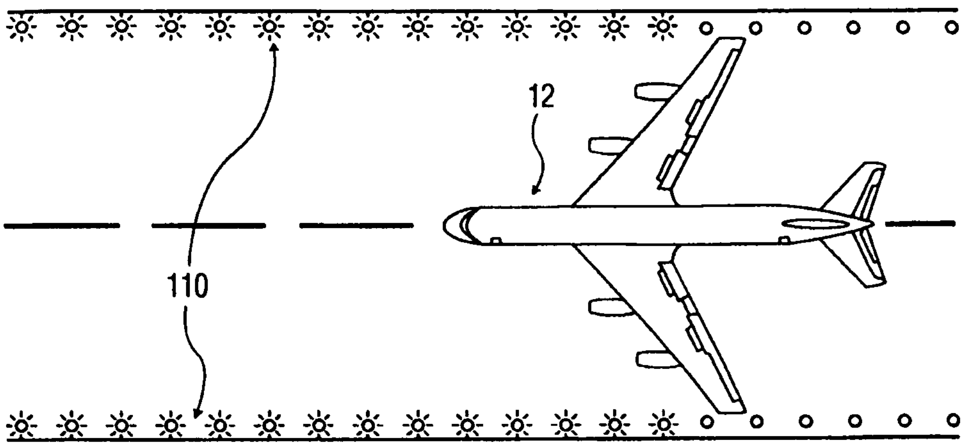
FIG. 7 is a top view of moving aircraft activating flashing light apparatus (located on each side of runway).
Figure 8:
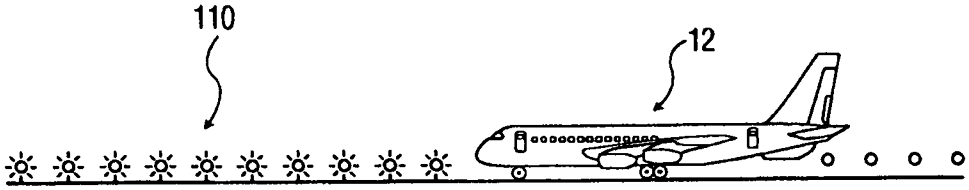
FIG. 8 is a side view of moving aircraft activating flashing light apparatus.

As shown in FIGS. 3 and 6, as the takeoff aircraft 12 proceeds down the runway, laser lenses 50 and 51 automatically adjust vertically to continue focusing and monitoring the airway of the projected lift and initial climb.

As the aircraft 12 proceeds down the runway, pulsating laser beams from the LIDAR laser transmitters 18 continues to activate additional flashing lights apparatus 110 on each side of runway to identify that it is currently in use. All in-flight airplanes in the vicinity through air traffic control 100 receive warnings that this runway is being used. Flashing lights apparatus 110 deactivate as the aircraft 12 passes (see FIGS. 7 and 8).

Figure 9:
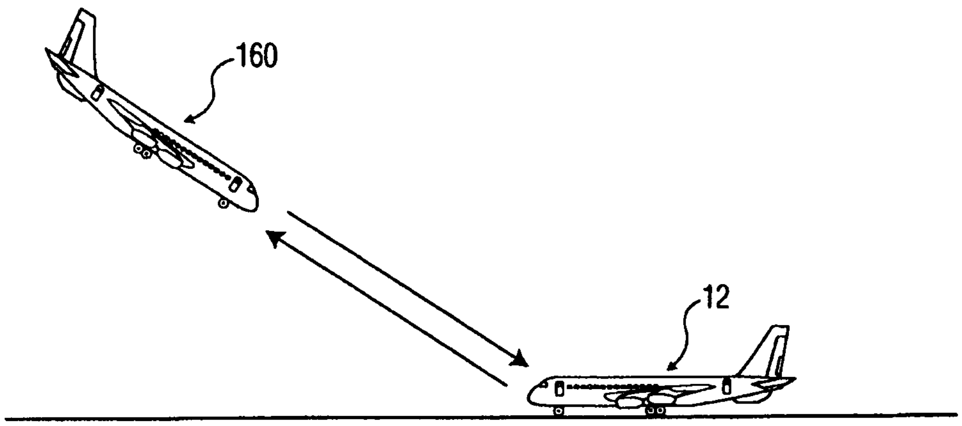
FIG. 9 is a side view illustrating how takeoff and landing aircrafts attempts to avoid a crash by activating present invention.

As shown in FIG. 9, any planes such as oncoming aircraft 160 that is in the direct pathway of transmitted laser beams from the LIDAR laser transmitter 18 of aircraft 12 will receive an audible warning through the LIDAR laser receiver 20 by means of playback module 130. In return, oncoming aircrafts 160 automatically resend the signal to the aircraft 12 through LIDAR laser transmitter 19 and laser receiver (sensor) 21, thereby alerting the pilot of aircraft 12 of a possible threat through playback module 130 or other warning methods.

Once the pilots of both the oncoming aircraft 160 and takeoff aircraft 12 have been alerted, the delay device 55 temporarily prevents the returned signal from aircraft 12 through LIDAR laser receiver (sensor) 21 from activating a third transmitter 26 unless the threat of possible collision persists for a specified time (in seconds), between aircraft 12 and oncoming aircraft 160.

If threat of a possible collision between aircraft 12 and oncoming aircraft 160 persist, LIDAR laser receiver (sensor) 21 through delay device 55 activates third transmitter 26 which in return automatically send RF (radio frequency) or/and digital signals and data to a remote central processing unit 75 (located on console of air traffic control 100) by means of third receiver 71 thereby alerting them by warning device 85 to monitor the probable collision threat between aircraft 12 and oncoming aircraft 160. The data sent by third transmitter 26 and received by third receiver 71 on the console of air traffic control 100 by means of Liquid crystal display 175 located on control panel 185 identifies the airplanes in question, including the takeoff and landing runway (if presently in use), the destination and air routes being traveled, and other pertinent information. The pilot enters this identification data into ALTACAS 10 computerized system through control panel 30 before aircraft taxi onto the runway.

Figure 10:
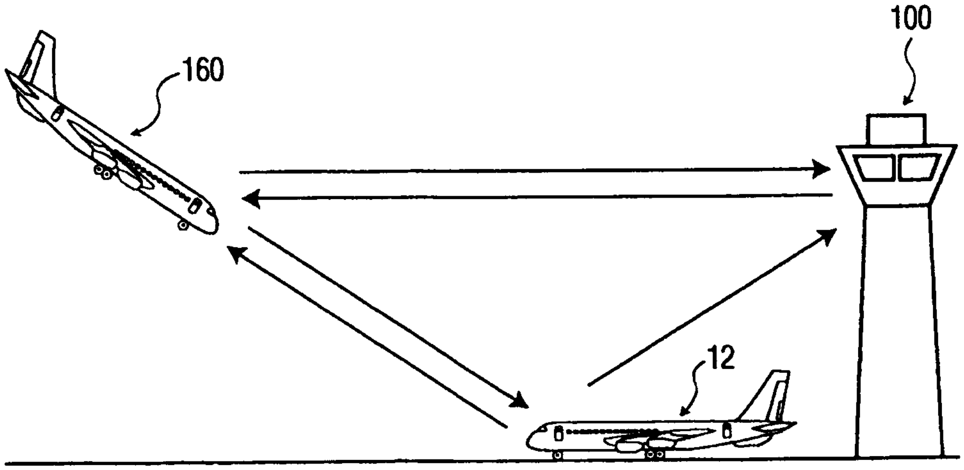
FIG. 10 is a side view illustrating how an automatic three-way verbal communication is opened between pilots of each aircrafts and air traffic control if planes are on a collision course with each other.

As shown in FIGS. 10, 11, 12, once air traffic control 100 is alerted, three-way satellite wireless telecommunication device 80 located on console of air traffic control automatically and simultaneously opens a three-way line of communication between pilots of aircraft 12 by means of three-way wireless telecommunication device 28 and oncoming aircraft 160 by means of three-way wireless telecommunication device 28, and air traffic control 100 to defuse the crisis.

If oncoming aircraft 160 is not directly traveling toward the aircraft 12 during takeoff but only crossing its path, aircraft 12 will not receive a returned signal that activates playback module 130 within it cockpit because the laser beam from the LIDAR laser transmitter 19 of the oncoming aircraft 160 can only reach aircraft 12 if they are directly facing each other. Why? Because as previously stated, unlike RF signals which are omni-directional, laser beams (signals) are unidirectional and linear—they travel in a straight line. Only planes in a continuous direct parallel line of path with aircraft 12 will keep warning devices 9 with playback 130 activated.

If the oncoming plane 160 is merely crossing the pathway of aircraft 12 during takeoff, playback module 130 will inform pilots of aircraft 12 and oncoming plane 160 that the threat of a possible collision no longer exists.

Since the laser beams emitted from LIDAR Transmitter 18 and 19 functions as a radar and rangefinder, a portion of the transmitted beam sent by aircraft 12 will reflect from oncoming plane 160 and return to aircraft 12, thereby providing the pilots of aircraft 12 with an imagery of oncoming plane 160 by means of radar screen 39 (as shown in FIG. 11); and the location, altitude, distance, speed, and direction of which oncoming plane 160 dangerously approaches.

Figure 3D:
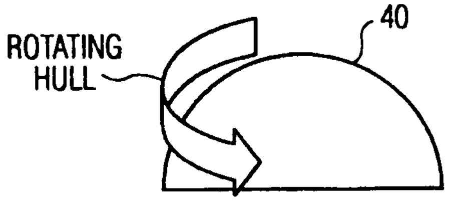
Figure 4:
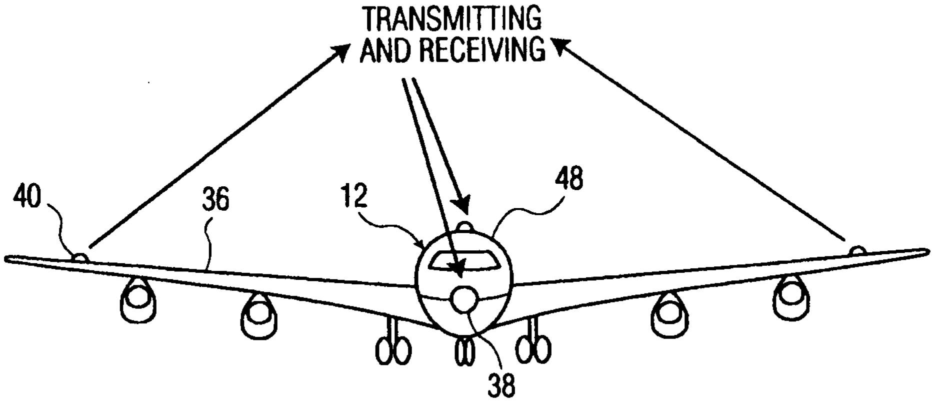
FIG. 4 is a front view showing an example of the locations of the laser transmitters-receivers unit on aircraft.

Once aircraft 12 reaches flight level altitude, as shown in FIG. 3D aerodynamically designed pivotal devices 40 that are housing laser lenses 50 and 51 are designed to either continuously rotate 180 degrees or rotate and lock in multiple directions to continue monitoring airspace around aircraft 12. Any in-flight airplane dangerously traveling toward aircraft 12 from any direction will automatically activate the five-way communication warning of ALTACAS 10 as shown in FIGS. 1 and 2.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An aerial, landing, takeoff collision avoidance system for aircrafts, wherein said system comprising:

a plurality of first transmitters and a plurality of second transmitters for emitting pulsating laser beams and a plurality of first receivers and a plurality of second receivers for detecting and receiving said laser beams, wherein said plurality of first transmitters and said plurality of second transmitters are each separately connected to plurality of multi-position optical laser lenses by means of optic cables, wherein said plurality of multi-position optical laser lenses and plurality of first receivers and said plurality of second receivers are housed in a plurality of aerodynamically designed pivotal devices;

a control panel comprising of a central processing unit, software, a liquid crystal display (LCD), a laser radar screen, an audible-visual warning device comprising of a playback module, and a navigational system having a Global Positioning System (GPS) and a trajectory apparatus electrically coupled to a speed monitoring and processing device that is electrically, mechanically, and pneumatically connected to said plurality of multi-position optical laser lenses;

a third transmitters and a three-way wireless communication device electrically coupled to said control panel;

a remote central processing unit comprising of a control panel, a liquid crystal display (LCD), a third receiver and a fourth receiver; a warning device, a three-way wireless telecommunication device;

a plurality of remote apparatuses comprising of: a housing having a front and a rear face; a first array of lights carried by front face of said housing; a second array of lights carried by front face of said housing; a third array of lights carried by rear face of said housing; a first sensor carried by said front face of said housing and is electrically connected to said first array of lights; a second sensor carried by said rear face of said housing and is electrically connected to said second array of lights; a transmitter and receiver carried by said housing; a power source for providing electrical power to said array of lights and said the sensors; a switch to connect and disconnect power source; and a means for attaching said housing to an object.

2. The system as recited in claim 1, wherein said plurality of first transmitters and said plurality of second transmitters and said plurality of first receivers and said plurality of second receivers are detecting means of said aircrafts.

3. The system as recited in claim 2, wherein said detecting means are capable of forewarning said aircrafts during takeoff and landing from intruder aircrafts simultaneously approaching the same runways and simultaneously approaching the same airway during climb and descent.

4. The system as recited in claim 2, wherein said detecting means are capable of forewarning said aircrafts omni-directionally during mid-flight from said intruder aircrafts simultaneously approaching the same airways.

5. The system as recited in claim 2, wherein said plurality of first transmitters and said plurality of second transmitter are lasers, and said plurality of first receivers and said plurality of second receivers are sensors that detects said lasers.

6. The system as recited in claim 2, wherein said plurality of first receivers are capable of receiving signals from said plurality of first transmitters, and said plurality of second receivers are capable of receiving signals from said plurality of second transmitters.

7. The system as recited in claim 2, wherein the combination of said plurality of first transmitters and said plurality of first receivers collectively functions as a LIDAR radar and combination of said plurality of second transmitters and said plurality of second receivers collectively functions as a LIDAR radar.

8. The system as recited in claim 7, wherein said LIDAR radar has an operating distance of approximately 1.3 miles.

9. The system as recited in claim 1, wherein said plurality of first receivers and said plurality of second receivers electrically communicates with said central processing unit, thereby activating said warning device comprising of said playback module.

10. The system as recited in claim 1, wherein said navigational Global Positioning System (GPS) having said trajectory apparatus contains software and a data entry system connected to said central processing unit to compute, process, and project lift-off of said aircraft's from runway and anticipated flight plan during the initial climb.

11. The system as recited in claim 10, wherein said navigational Global Positioning System (GPS) electrically communicates with said speed monitoring and processing devices.

12. The system as recited in claim 11, wherein said speed monitoring and processing devices have software that is capable of monitoring the speed and wind factors of said aircrafts and automatically compute, process, and control electrically, pneumatically and mechanically the vertical movement of said plurality of multi-position optical laser lenses to varying degrees of angles to monitor the said runway and projected airway of climb for said intruder aircrafts as said aircrafts proceed down said runway during takeoff and climb.

13. The system as recited in claim 12, wherein automatic adjusting of said plurality of multi-position optical laser lenses can alternately be replaced with those that are preset at varying angles of degrees to monitor the runway and airway of said aircrafts during various stages of takeoff and climb until it reaches the correct flight level altitude.

14. The system as recited in claim 12, wherein said multi-position optical laser lens are housed in a plurality of aerodynamically designed pivotal devices that are mounted to the wings, nose, or fuselage of the said aircrafts.

15. The system as recited in claim 2, wherein said plurality of first transmitters and said plurality of first receivers and said plurality of second transmitters and said plurality of second receivers functions as a radar and rangefinder and allows said aircrafts to receive reflected laser beams from said intruder aircrafts.

16. The system as recited in claim 15, wherein said reflected laser beams carries data comprising of imagery, direction, speed, and distance and time between said aircrafts and intruder aircrafts and displayed data on said liquid crystal display (LCD) and said laser radar screen.

17. The system as recited in claim 1, wherein said third receiver is capable of receiving data from third transmitter.

18. The system as recited in claim 17, wherein said third transmitter and said third receiver are selected from the group consisting of digital, infrared, microwave, radio-frequency (RF), and satellite.

19. The system as recited in claim 1, wherein said second transmitter electrically communicates with third transmitter through a time delay device when said intruder air crafts are on a definite collision course with said aircrafts.

20. The system as recited in claim 19, wherein said third transmitter and said third receiver are capable of carrying data to said central processing unit of said remote control panel, and activate said playback module of warning device of said remote control panel.

21. The system as recited in claim 1, wherein said warning device activates said three-way wireless satellite telecommunication device through said central processing unit of said remote panel, thereby opening a simultaneous three-way line of communication between said air traffic control, said aircrafts, and said intruder aircrafts.

22. The apparatus as recited in claim 1, wherein said remote apparatus identifies runway usages during takeoffs and landings of said aircrafts.

23. The apparatus as recited in claim 1, wherein said plurality of remote apparatuses identifies intersecting runway usages during takeoffs and landings of said aircrafts.

24. The apparatus as recited in claim 1, wherein said plurality of remote apparatuses for warning said aircrafts carries said first sensor that detects said aircrafts during takeoffs which activates said first array of lights, and said second sensor that detects said aircrafts during landings that activates said second array of lights, and said first sensor and said second sensor that detects said aircrafts through said transmitter and said receiver of plurality of remote apparatuses on intersecting runways that activates third array of lights.

25. The apparatus as recited in claim 1, wherein said first sensor and said second sensor that detects said solid state lasers is selected from the group consisting of light sensors, motion sensors, laser sensors, microwave sensors, sonic sensor, and infrared sensors.

26. The apparatus as recited in claim 25, said transmitter and said receiver of plurality of remote apparatuses are selected from the group consisting of Radio-Frequency, sonic, microwave, laser, and infrared.

27. The system as recited in claim 26, wherein said plurality of aerodynamically designed pivotal devices are capable of turning horizontally and vertically in a sweeping continuous mode to horizontally and vertically monitor airspace once said aircrafts reach flight level altitude.

28. The apparatus as recited in claim 1, wherein said fourth receiver of said remote control panel is electrically connected to said warning device and responsive to said transmitter of plurality of remote apparatuses.

29. The apparatus as recited in claim 1, wherein said transmitter of said plurality of remote apparatuses is capable of sending signals to said liquid crystal display of said control panel of said aircrafts through a receiver to activate said warning device comprising of said playback module.

30. The apparatus as recited in claim 1, wherein said power source of said plurality of remote apparatuses is electricity.

31. The apparatus as recited in claim 1, wherein said power source of said plurality of remote apparatuses is dry cell battery.

32. The apparatus as recited in claim 1, wherein said power source of said plurality of remote apparatuses is a solar cell.

33. The apparatus as recited in claim 1, wherein said first transmitter and second transmitter and said first receiver and second receiver and said third transmitter and said third receiver collectively functions as a five-way transponder.

* * * * *